(12) United States Patent
Laborie et al.

(10) Patent No.: US 6,202,403 B1
(45) Date of Patent: Mar. 20, 2001

(54) CORE COMPARTMENT VALVE COOLING VALVE SCHEDULING

(75) Inventors: Daniel J. Laborie, West Chester; Michael Mc Nulty, Mason, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/218,915

(22) Filed: Dec. 22, 1998

(51) Int. Cl.$^7$ .................................................... F02C 7/12
(52) U.S. Cl. ............................................................ 60/39.83
(58) Field of Search ................................ 60/226.1, 242, 60/39.04, 39.83

(56) References Cited

U.S. PATENT DOCUMENTS

| | | |
|---|---|---|
| 2,777,301 | 1/1957 | Kuhn . |
| 4,416,111 | 11/1983 | Lenahan et al. . |
| 4,441,314 * | 4/1984 | Fitton ........................................ 60/266 |
| 4,474,001 * | 10/1984 | Griffin et al. ........................... 60/204 |
| 4,494,372 | 1/1985 | Cronin . |
| 4,684,081 | 8/1987 | Cronin . |
| 5,012,639 * | 5/1991 | Ream et al. .......................... 60/226.1 |
| 5,123,242 | 6/1992 | Miller . |
| 5,137,230 | 8/1992 | Coffinberry . |
| 5,357,742 * | 10/1994 | Miller ................................... 60/39.07 |
| 5,363,641 | 11/1994 | Dixon et al. . |
| 5,414,992 | 5/1995 | Glickstein . |
| 5,442,905 | 8/1995 | Claeys et al. . |
| 5,511,374 | 4/1996 | Glickstein et al. . |
| 5,724,806 | 3/1998 | Horner . |
| 6,055,805 * | 5/2000 | El-Aini et al. ....................... 60/226.1 |

* cited by examiner

Primary Examiner—Charles G. Freay
(74) Attorney, Agent, or Firm—Andrew C. Hess; Nathan D. Herkamp

(57) ABSTRACT

A system is provided for cooling the undercowl environment of a gas turbine engine having a high pressure compressor and a core gas stream. An electronically controlled compartment cooling valve is controlled as a function of corrected fan speed, altitude, ambient conditions, extreme hot day temperatures and the aircraft environmental control system. A cooling manifold distributes cooling air in the undercowl environment. A regulator, such as an on-off control valve, modulates the amount of undercowl cooling flows as a function of any of a variety of conditions.

6 Claims, 5 Drawing Sheets

CORE COMPARTMENT VALVE COOLING VALVE SCHEDULING

TECHNICAL FIELD

The present invention relates to turbofan engines and, more particularly, to turbofan engines equipped with a valved core compartment cooling system.

BACKGROUND OF THE INVENTION

The highest temperatures in turbofan engines are typically found in the combustor and the turbines. The continuing demand for larger and more efficient turbofan engines creates a requirement for increased turbine operating temperatures. However, as the combustor and turbine hot gas temperatures have been increased to achieve increased output and thermal efficiencies, the challenge to maintain control and accessory component lives, due to the metallurgical limitations of critical hot components has also increased.

Turbofan engines equipped with a valved core compartment cooling (CCC) system typically extract cooling air from the fan stream and includes a core compartment cooling valve and cooling manifold to provide cooling to the control and accessory components located undercowl. In the prior art, control of the core compartment cooling valve was achieved as a function of altitude and engine core speed. However, the major control parameter for a typical turbofan engine is corrected fan speed. Takeoff, MCT (maximum continuous), climb and cruise regimes are defined by a given range of corrected fan speed, and there is only a weak relationship between uncorrected core speed and takeoff, MCT, climb and cruise regimes. Consequently, controlling the CCC valve as a function of uncorrected core speed resulted in forcing the valve to be opened in cruise conditions where it could have been closed, resulting in some inefficiencies at cruise and loss of specific fuel consumption.

Furthermore, prior art CCC valve schedules do not take into account the ambient conditions resulting in forcing the valve to be opened in cruise conditions regardless of the outside ambient temperature. The schedule is defined to maintain an acceptable undercowl temperature environment at the worst case condition to meet Federal Airworthiness Requirements, which is an extreme hot ambient condition and causes the valve to be opened at cooler temperatures where it could be closed, again resulting in some inefficiencies at cruise and consequent loss of specific fuel consumption.

Furthermore, prior art CCC valve schedules do not take into account the heat loads introduced by the aircraft ECS (environmental control system) bleed air system. The schedule is defined to maintain an acceptable undercowl temperature environment at the worst case condition to meet Federal Airworthiness Requirements, which corresponds to the highest aircraft ECS demand and therefore the highest heat loads and causes the valve to be opened at normal ECS demand conditions where it could be closed, again resulting in some inefficiencies at cruise and consequent loss of specific fuel consumption.

It is an object of the present invention improve efficiency of core compartment cooling to valve scheduling.

It is a further object of the present invention to provide core compartment cooling valve scheduling as a function of corrected fan speed, altitude, ambient conditions and aircraft environmental control system bleed air demand.

It is yet another object of the present invention to be able to adjust the schedule very precisely to improve efficiency.

SUMMARY OF THE INVENTION

The present invention provides for controlling and scheduling of compartment cooling valves in a turbofan engine using unique input parameters. The present invention improves the control schedule by considering various factors that affect the undercowl (i.e., ambient) temperature, by considering aircraft bleed air demand/configuration, and by replacing core speed by fan speed. The overall effect is to better adjust the amount of cooling flows to the true needs of the system, which provides a more efficient engine.

In accordance with one aspect of the present invention, a system is provided for cooling the undercowl environment of a turbofan engine having a high pressure compressor and a core gas stream. An electronically controlled compartment cooling valve is controlled as a function of corrected fan speed, altitude, ambient conditions, extreme hot day temperatures and aircraft environmental control system configuration. A cooling manifold is used to distribute the cooling air within the engine core compartment. A regulator, such as an on-off control valve, modulates the amount of undercowl cooling flows as a function of any of a variety of conditions.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with objects and advantages thereof, may best be understood by reference to the following description taken in conjunction with the accompanying drawings in which:

DETAILED DESCRIPTION OF THE INVENTION

Figure 1:
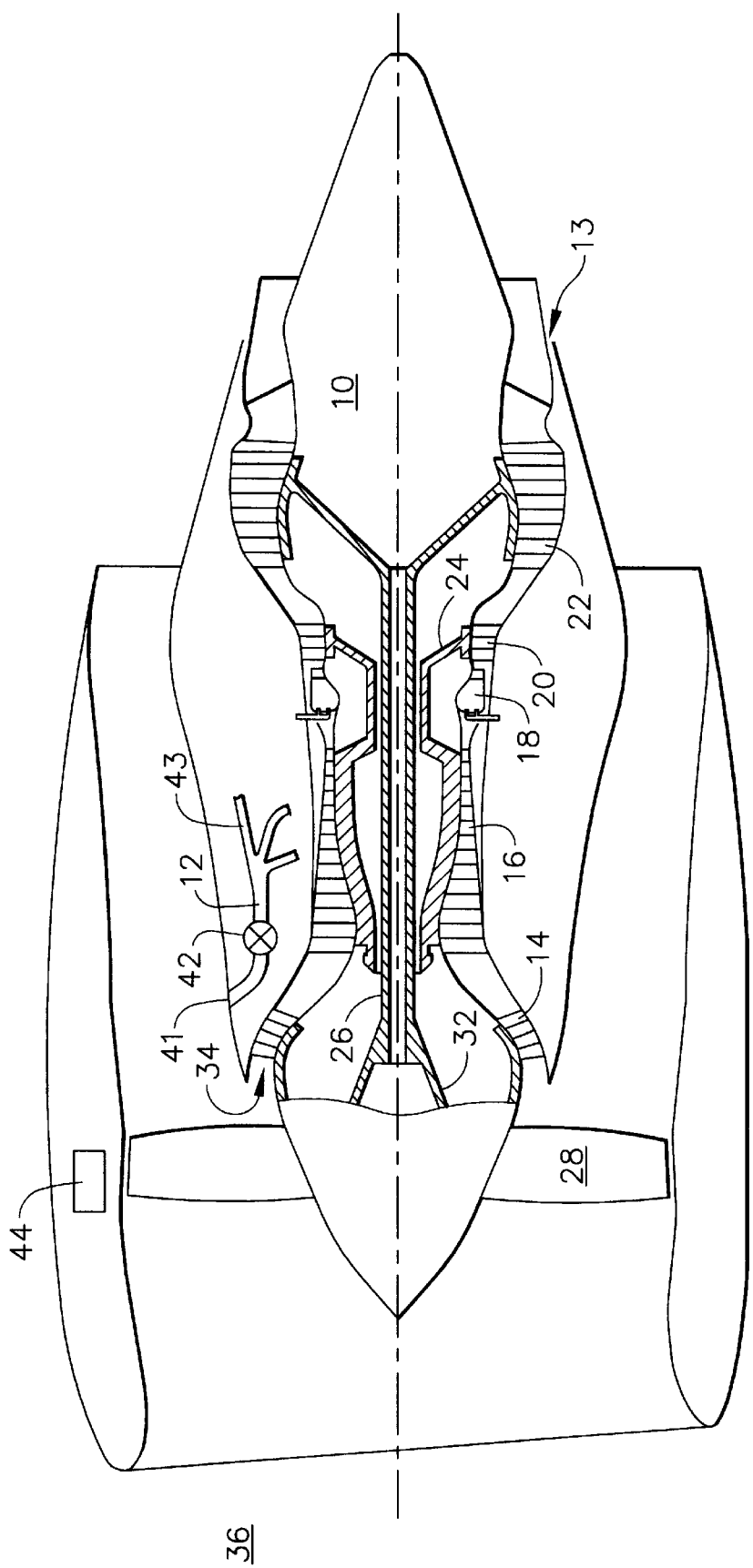
FIG. 1 is a block diagram of a turbofan engine incorporating the cooling system of the present invention.

Referring to the drawings, FIG. 1 is a block diagram of a turbofan engine 10 incorporating an engine undercowl cooling system indicated generally at 12, according to the present invention. The exemplary turbofan engine 10 illustrated in FIG. 1 is derived from a turbofan engine of the type used to propel aircraft. Engine 10 includes, in serial flow relationship, a fan 28, a booster or low pressure compressor 14, a high pressure compressor 16, a combustor 18, a high pressure turbine 20 and a low pressure turbine 22. The high pressure turbine 20 is drivingly connected to the high pressure compressor 16 with a first rotor shaft 24 and the low pressure turbine 22 is drivingly connected to the low pressure compressor 14 with a second rotor shaft 26 coaxially disposed within shaft 24 about a longitudinal centerline axis of engine 10. Engine 10 is used to drive fan 28 through shaft extension 32.

The undercowl cooling system receives fan discharge air through inlet 41, includes a core compartment cooling valve 42 and a cooling air manifold 43 that is used to distribute the cooling air within the core compartment according to the needs of the various controls and accessories. The undercowl cooling flows are typically discharged overboard at the aft end of the core compartment through aft vent 13.

The core compartment cooling valve 42 is generally fully open at low altitude high engine power settings where the heat loads are maximum to provide adequate cooling of controls and accessories. At higher altitude, cruise regime where the heat loads are reduced, the core compartment cooling valve closes thereby reducing the consumption of fan air and enhancing fuel consumption while still providing adequate cooling of engine controls and accessories. Typically, the core compartment cooling valve is commanded open/closed as a function of engine core speed (i.e. rotor shaft 24 speed) and altitude by the engine electronic control unit 44.

A departure from the prior art is to use corrected fan speed as opposed to uncorrected core speed. Corrected fan speed (N1K) is expressed as:

fan speed (i.e. rotor shaft 26 speed)/ SQRT (THETA)

where THETA=[Total Air Temperature(in degrees Rankine)/ 518.67]. N1K is widely used in the aircraft industry as the primary parameter used to control engine thrust.

By using corrected fan speed, the schedule can be adjusted very precisely (within 0.1% N1K) to force the valve to be open at MCT (maximum continuous, i.e. high engine power settings) conditions and to be closed at cruise conditions. In FIG. 3A (current state of the art), area 50 shows the core speed versus altitude conditions during which the CCC valve is normally open, and area 52 shows the core speed versus altitude conditions during which the CCC valve is normally closed. The schedule according to the present invention is now controlled by corrected fan speed/ altitude as shown in FIG. 3B.

According to another aspect of the invention, the schedule is function of the ambient temperature conditions. The schedule has been defined to close the CCC valve at all cruise conditions (defined by a range of corrected fan speeds) during most probable ambient conditions (i.e. standard days and below), as indicated by area 54 in FIG. 3B, therefore ensuring that the specific fuel consumption (SFC) savings will be realized at all corresponding cruise conditions. In extreme hot day conditions, the CCC valve cannot be closed at all cruise conditions because some of the undercowl components would operate above their temperature limits at the higher end of the cruise conditions (defined by a range of N1K), and these conditions are indicated by area 56 in FIG. 3B. However, the CCC valve could be closed on the lower and middle end of the cruise range at these extreme hot day conditions because all undercowl components would remain within their temperature limits, as also indicated by area 56. The CCC valve is open during conditions indicated by area 58. The corrected fan speed at which the CCC valve closes has therefore, in accordance with the present invention, been made dependent on the ambient temperature of the ambient air 36.

A derivative of component temperature versus N1K has been established (by flight testing) at various altitudes for these few components that would exceed their steady-state temperature limits at maximum cruise on extreme hot day conditions. This derivative is used to define the maximum corrected fan speed at which the CCC valve can be closed while maintaining all components within their steady-state limits on an extreme hot day condition at a given altitude.

Figure 3B:
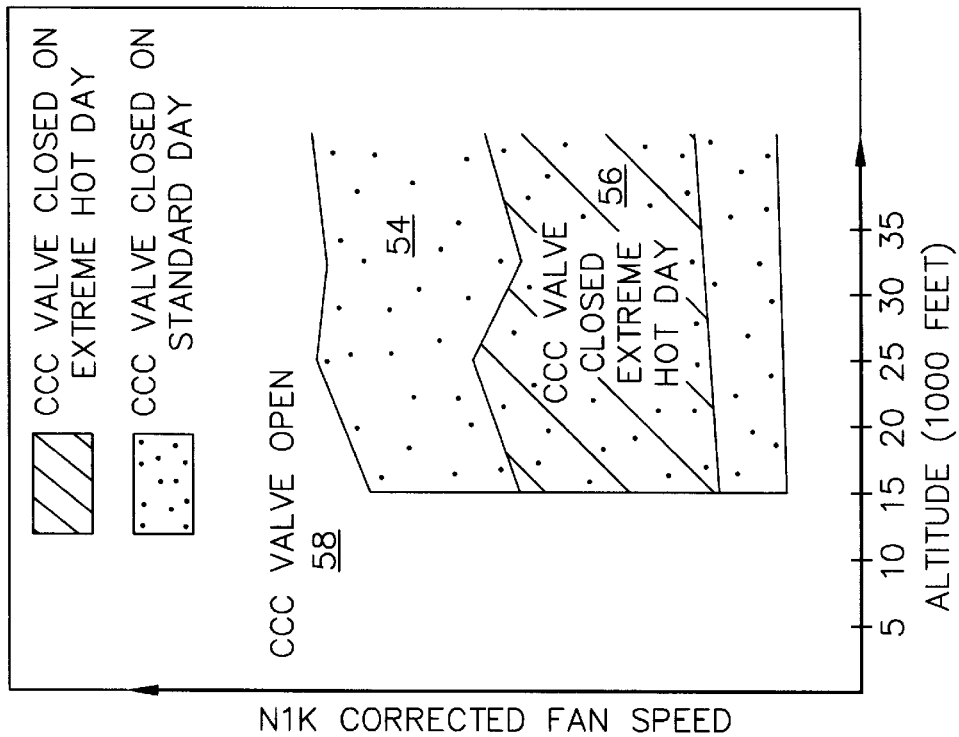
FIG. 3B is a graphical representation showing the altitude and core speed at which the CCC valve is open, closed on a standard day, and closed on an extreme hot day, in accordance with the present invention.
Figure 3A:
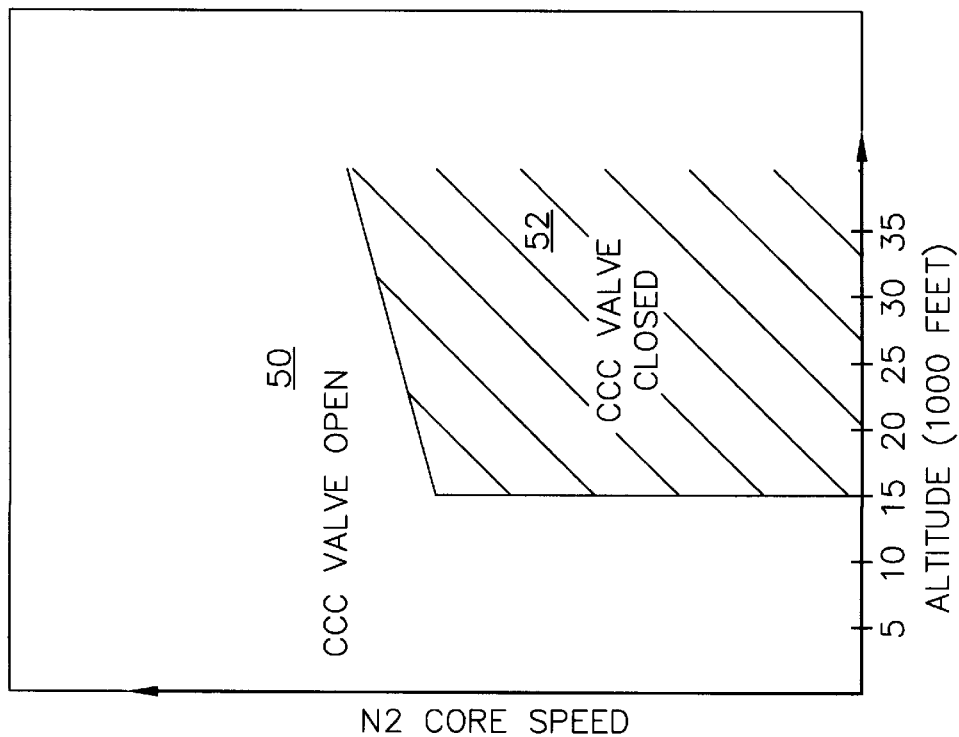
FIG. 3A is a graphical representation of the current art of CCC valve scheduling showing altitude and core speed at which the CCC valve is open and closed.

In accordance with the present invention, therefore, two switch-over design curves of FIG. 3B are defined as a function of altitude. The first switch-over design curve, in FIG. 3B, is a standard day schedule (ISA+0° F.), indicative of the corrected fan speed at which the CCC valve needs to open on standard and cold days (typically slightly above maximum cruise to make sure that the valve is open at MCT). The second switch-over design curve, of FIG. 3B, represents a hot day schedule (ISA+° F.), which is the corrected fan speed at which the CCC valve needs to open on an extreme hot day condition. The exact value of x is based on the International Definition of the Atmosphere and defined by the aircraft manufacturer. For ambient temperatures between ISA and ISA+x° F., the switch-over schedule is interpolated between the standard day and the hot day schedules as a function of DTAMB. DTAMB is defined as the ambient temperature less the standard temperature, and is internally calculated by the engine electronic control unit 44.

Figure 5:
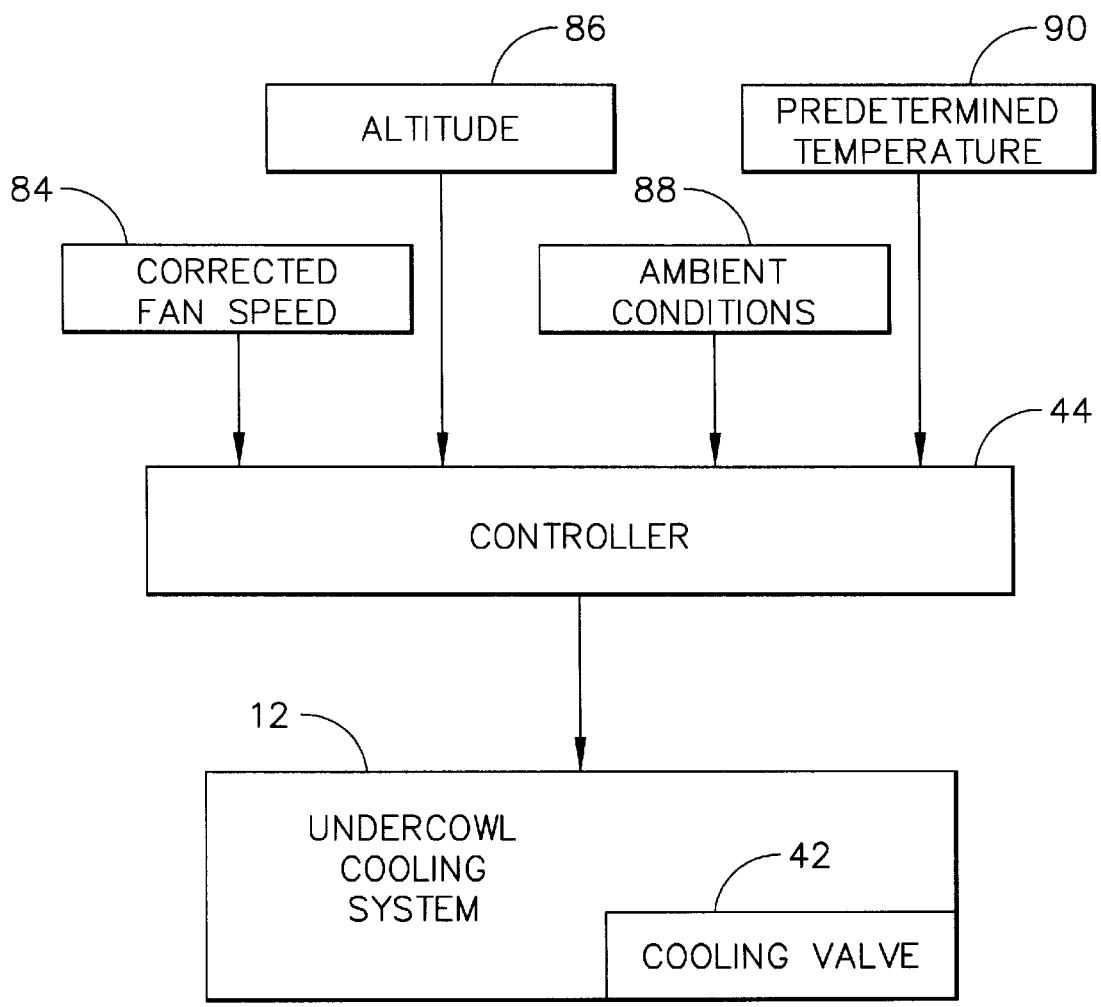
FIG. 5 is a block diagram illustrating the control of the cooling valve of FIG. 1 in dependence unpin unique parameters.

As illustrated in FIG. 5, the electronically controlled compartment cooling valve 42 is controlled as a function of predetermined parameters comprising corrected fan speed 84, altitude 86, ambient conditions 88, and predetermined temperatures 90 (typically extreme hot day temperatures). A control unit 44 connected to the cooling valve receives as inputs the predetermined parameters to control the cooling valve 42.

Figure 2:
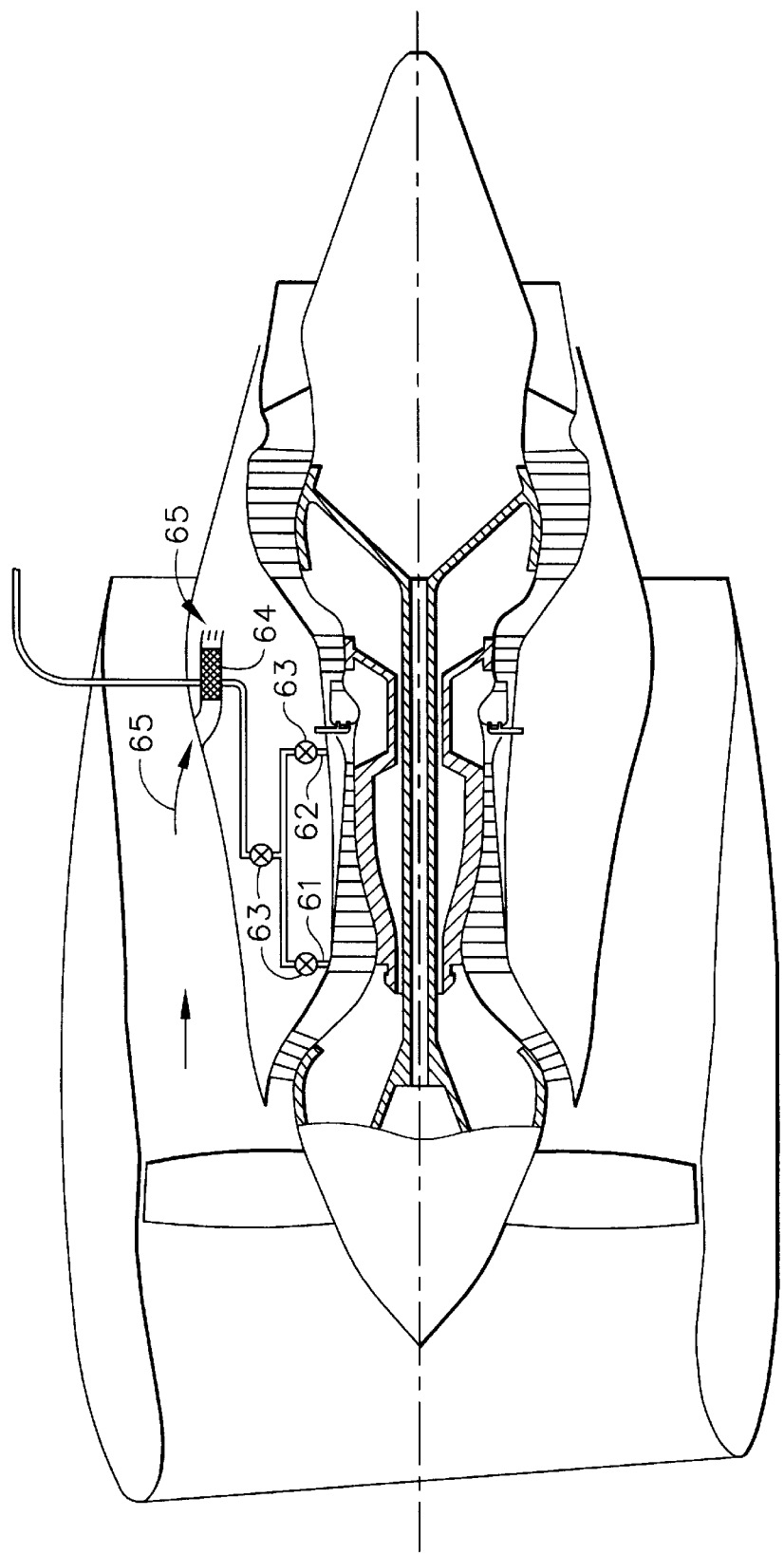
FIG. 2 is a block diagram depicting a typical aircraft engine ECS system and is provided only for clarifying the scope of the invention.

The effect of higher aircraft ECS (environmental control system) bleed air demand on the undercowl temperatures is generally significant, 50 to 60° F. in local areas close to the ECS ducts. A typical ECS system, illustrated in FIG. 2, extracts engine compressed air from the low stage high compressor through bleed duct 61 or high stage high compressor duct 62 and, through an appropriate arrangement of valves 63 routes the compressed air to the aircraft cabin. The temperature effect can be much more accentuated when a aircraft precooler 64 is used to pre-cool the engine ECS air before it enters the strut and wing and discharges undercowl. The precooler 64 is an air-to-air heat exchanger that typically uses fan air 65 to cool the bleed air extracted from the engine. In some applications, as shown in FIG. 2, the precooler discharges undercowl at 65. As the ECS bleed demand increases, the precooler flows discharging undercowl increase, resulting in higher heat loads undercowl and in back-pressurization of the engine core compartment cooling system. The combined effect, then, is an increase in heat loads and a reduction in cooling flows.

Figure 4:
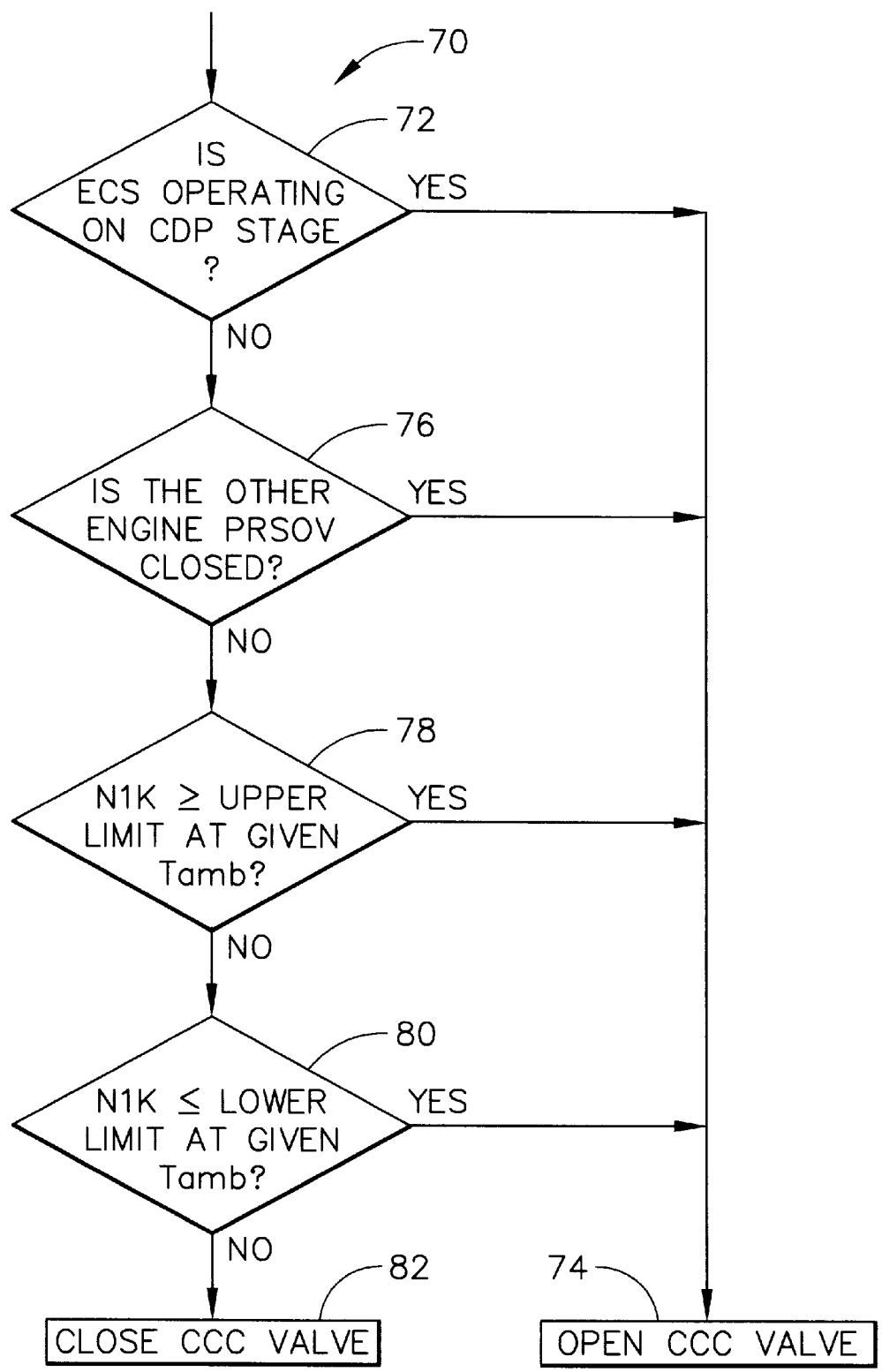
FIG. 4 is a flow chart diagram of the CCC valve logic, in accordance with the present invention.

To accommodate this aircraft ECS operational characteristic, the cooling system in accordance with the present invention has been sized to maintain all undercowl components within their steady-state limits at cruise with the CCC valve scheduled as a function of N1K, altitude and DTAMB when the aircraft ECS is in its normal configuration (i.e. one aircraft air-conditioning pack load per engine, bleed extraction on the engine lower compressor stage). When the aircraft ECS departs from its normal configuration/ operation, the schedule opens the CCC valve to accommodate the higher heat loads and the increased undercowl pressure. This happens in two cases. First, when the aircraft ECS is configured with two aircraft air-conditioning pack load per engine, which happens when the engine ECS system on the opposite engine is shutdown. This situation is recognized by the engine electronic control unit through the position of the ECS valve on the opposite engine transmitted by the aircraft. The second case is when the aircraft ECS operates on the engine higher compressor stage. Typically, the aircraft ECS system will switch to the higher stage as a function of compressor pressure; when the lower compressor stage pressure is too low, the ECS will switch to the higher stage. This is done by simulating the aircraft defined switch-over schedule in the engine electronic control unit. By way of example, on certain applications, the engine electronic control unit will open the CCC valve when the compressor high stage pressure falls below a predetermined value, function of altitude, as shown in FIG. 4. Of course, it will be obvious to those skilled in the art that other simulation may be used and will be case dependent.

The CCC valve schedule may include certain safety provisions in case of malfunctions of some of the enabling features. These can help to avoid overtemperature of the compartment and components. For example, the valve is scheduled open if the CCC valve position is in disagreement with the commanded position; if the aircraft signal providing the opposite engine ECS valve position is failed or invalid; if the aircraft signal providing the altitude information is failed or invalid; if the engine PS3 signal (compressor high stage pressure) is failed; or if the N1K signal is failed or invalid.

The CCC valve logic is shown in flow chart 70 of FIG. 4. If it is determined at decision block 72 that the aircraft ECS is operating on CDP (Compressor Discharge Pressure) stage, then the CCC valve is open (region 58 of FIG. 3B) at block 74. If not, then a decision is made at block 76 as to whether the other engine PRSOV (Pressure Regulating and Shut Off Valve) is closed. If yes, the CCC valve is open (region 58 of FIG. 3B); if no, a decision is made at block 78 as to whether N1K is greater than or equal to an upper limit at a given ambient temperature. If the decision is yes, the valve is open, as indicated by region 58 of FIG. 3B. If the decision is no, then another decision is made at block 80 to determine if N1K is less than or equal to a lower limit at a given ambient temperature. If yes, the CCC valve is open, as the range is within area 58 of FIG. 3B. If not, the CCC valve is closed, as indicated by block 82, since the conditions will be in region 54 or 56 of FIG. 3B.

The present invention brings numerous advantages in regards to the previous art, resulting in higher Specific Fuel Consumption (SFC) savings at cruise. One advantage is more accurate switch-over schedule of the CCC valve. By using N1K as the control parameter, the valve closure can be scheduled for all cruise conditions, therefore assuring consistent SFC savings. Another advantage of the present invention is improved sizing of the cooling system. The system can be designed with the CCC valve closed for normal cruise conditions at the most probable range of ambient conditions. This avoids oversizing of the cooling system and, therefore, avoids higher cooling flows and higher SFC penalty, to account for unlikely conditions. For situations that are outside the normal range, the CCC valve is scheduled open. Yet another advantage is that the schedule of the present invention uses the difference between the measured ambient temperature and the standard temperature as a control parameter. Even though control of the CCC valve is an open loop, this method permits the valve to be open for all conditions where an undercowl component could operate above its steady-state limit at cruise.

The schedule of the present invention also accounts for the aircraft ECS configuration, either by detecting its actual configuration through signals transmitted by the aircraft, or by simulating its operation through engine parameters.

While the principles of the invention have now been made clear in an illustrative embodiment, there will become obvious to those skilled in the art many modifications in structure, arrangement, and components used in the practice of the invention and otherwise which are particularly adapted for specific operating requirements without departing from those principles. For example, one alternative that may be considered is to define two switch-over design curves as a function of altitude. That is, a standard day schedule and a hot day schedule. For ambient temperatures between ISA and hot day, the switch-over schedule is interpolated between the standard day and the hot day schedules as a function of DTAMB, where DTAMB is defined as the ambient temperature less the standard temperature.

In the present invention, the switch-over schedule is a function of the aircraft ECS configuration, because of the specific architecture and resulting loads of the aircraft ECS system (precooler discharging undercowl). The dependence on aircraft ECS configuration may be deleted for certain applications, with the application of the present invention.

Having described the invention in detail and by reference to the preferred embodiment thereof, it will of course be apparent that other modifications and variations are possible without departing from the scope of the invention defined in the appended claims. The appended claims are therefore intended to cover and embrace any such modifications, within the limits only of the true spirit and scope of the invention.

What is claimed is:

1. A system for cooling the undercowl environment of a gas turbine engine having a high pressure compressor and a core gas stream, the cooling system comprising:

an electronically controlled compartment cooling valve, the valve being controlled as a function of predetermined parameters comprising corrected fan speed, altitude, ambient conditions, a predetermined temperature and an aircraft environmental control system operating state;

a control unit connected to the electronically controlled compartment cooling valve for receiving as inputs the predetermined parameters to control the electronically controlled compartment cooling valve; and a cooling manifold for cooling air distribution in the electronically controlled compartment cooling valve.

2. A system as claimed in claim 1 wherein the control unit controls the cooling valve to be essentially fully open when it receives signals indicating low altitude, high engine power settings.

3. A system as claimed in claim 1 wherein the control unit controls the cooling valve to be closed when it receives signals indicating high altitude cruise conditions.

4. A system as claimed in claim 3 wherein the control unit controls the cooling valve to be open at cruise conditions when it receives signals indicating a predetermined high temperature.

5. A system as claimed in claim 4 wherein the control unit controls the cooling valve to be closed at low and middle cruise conditions when it receives signals indicating a predetermined high temperature.

6. A system as claimed in claim 1 wherein the control unit controls the corrected fan speed at which the cooling valve closes as a function of ambient temperature.

* * * * *

UNITED STATES PATENT AND TRADEMARK OFFICE
CERTIFICATE OF CORRECTION

PATENT NO. : 6,202,403 B1
DATED : March 20, 2001
INVENTOR(S) : Daniel J. Laborie et al.

It is certified that error appears in the above-identified patent and that said Letters Patent is hereby corrected as shown below:

Column 2,
Line 46, delete "and core speed" and insert -- and corrected fan speed --

Column 3,
Lines 58 and 59, delete "and these conditions are indicated by area 56 in FIG. 3B"

Column 4,
Line 17, delete "ISA+°F" and insert -- ISA+ x °F --

Signed and Sealed this

Thirtieth Day of April, 2002

*Attest:*

JAMES E. ROGAN
*Attesting Officer*   Director of the United States Patent and Trademark Office